United States Patent
Lawson

(10) Patent No.: US 6,974,286 B2
(45) Date of Patent: Dec. 13, 2005

(54) DEBURRING TOOL

(75) Inventor: Douglas K. Lawson, Chapel Hill, NC (US)

(73) Assignee: ATI Industrial Automation, Inc., Apex, NC (US)

(*) Notice: Subject to any disclaimer, the term of this patent is extended or adjusted under 35 U.S.C. 154(b) by 55 days.

(21) Appl. No.: 10/628,063

(22) Filed: Jul. 25, 2003

(65) Prior Publication Data

US 2005/0019123 A1 Jan. 27, 2005

(51) Int. Cl.[7] .............................................. B23C 3/12
(52) U.S. Cl. ..................... 409/140; 409/138; 409/184; 409/201; 408/127
(58) Field of Search .............................. 409/140, 139, 409/138, 180, 143, 184, 201, 206; 408/127; 901/47

(56) References Cited

U.S. PATENT DOCUMENTS

| | | | | |
|---|---|---|---|---|
| 1,782,633 A | * | 11/1930 | Schiltz | 408/127 |
| 2,108,699 A | * | 2/1938 | Walther | 408/127 |
| 4,332,066 A | * | 6/1982 | Hailey et al. | 901/41 |
| 4,338,052 A | * | 7/1982 | Lockett | 409/206 |
| 4,637,775 A | * | 1/1987 | Kato | 409/138 |
| 4,784,540 A | | 11/1988 | Underhaug | |
| 4,798,024 A | | 1/1989 | Grimm | |
| 4,800,802 A | * | 1/1989 | Rebman | 901/45 |
| 4,836,722 A | * | 6/1989 | Kurita et al. | 409/180 |
| 4,860,500 A | * | 8/1989 | Thompson | 409/138 |
| 4,993,896 A | * | 2/1991 | Dombrowski et al. | 409/138 |
| 5,312,212 A | * | 5/1994 | Naumec | 409/138 |
| 5,765,975 A | * | 6/1998 | Hoffmann et al. | 409/138 |
| 6,086,294 A | * | 7/2000 | Danchine et al. | 409/138 |

FOREIGN PATENT DOCUMENTS

| | | |
|---|---|---|
| DE | 3710688 | 10/1988 |
| DE | 4242874 | 11/1993 |
| EP | 421917 A1 * | 4/1991 |
| JP | 60-131106 A * | 7/1985 |
| JP | 64-2811 A * | 1/1989 |
| WO | WO 02/064323 | 8/2002 |

OTHER PUBLICATIONS

"CNC–Flexicut 240", product description from Amtru Business AG, Jul. 2004, 4 pages.*

* cited by examiner

Primary Examiner—Erica Cadugan
(74) Attorney, Agent, or Firm—Coats & Bennett, P.L.L.C.

(57) ABSTRACT

A robotic deburring tool having a housing. Mounted within the housing is a pneumatic motor that includes a backwall and a drive shaft. Secured to the terminal end of the drive shaft is a deburring tool. A pivot-bearing is mounted in the housing adjacent the backwall. A connector extends from the backwall of the pneumatic motor and connects to the pivot bearing, thereby permitting the pneumatic motor to freely articulate radially in any direction while preventing free rotation about the bearing's longitudinal axis. A compliance device extends around the pneumatic motor at a location between the backwall and the deburring tool secured to the drive shaft. The compliance device restricts the movement of the pneumatic motor while applying a compliance force to the pneumatic motor as the pneumatic motor moves with the pivot bearing.

28 Claims, 7 Drawing Sheets

DEBURRING TOOL

FIELD OF THE INVENTION

The present invention relates to deburring tools, and more particularly to a robotic deburring tool.

BACKGROUND OF THE INVENTION

It is common to program robots to perform routine and repetitive tasks in manufacturing. One such task is the deburring of the edges of machined or cast parts. A robotic arm may be fitted with a deburring tool and programmed to follow a path around the edge of a particular part or object which is to be deburred.

There are some difficulties normally associated with the use of robotically controlled deburring tools. Since the programmed path of the robotic arm is in essence a series of incremental steps, the path of the robotically controlled deburring tool does not exactly coincide with the shape or contours of the surface to be deburred. In addition, the edge or surface may have cavities within the surface or even protrusions, sometimes prevalent in castings, extending from the surface to be deburred. These pockets and protrusions interfere with the path and cutting force of the robotic tool. A protrusion will urge the cutting surface of the deburring tool out of its programmed path and cause a consequent increase in cutting force. The increased cutting force may cause the deburring tool to cut too deep into the surface. Moreover, the increased cutting force may cause damage to the cutting surface of the tool. A cavity on the other hand may cause the deburring tool to separate or diverge from the surface to be machined. The separation of the cutting surface of the tool from the surface to be deburred will prevent the deburring of that portion of the part or workpiece. Consequently, the overall quality of the product being deburred will be affected.

In addition to part variations, there are fixture variations. Fixtures are structures that hold the parts while the parts are being subjected to deburring. Fixtures are designed to hold the parts such that the surface to be deburred aligns with the programmed path of the deburring tool. However, typically, these fixtures will have variations, and the variations will result in the surfaces of the parts to be deburred being misaligned with the programmed path of the deburring tool.

Traditionally, these problems have been dealt with by designing expensive and complicated active compliance whereby sophisticated electronic controls manipulate the robotic arm. Compliance compensates for errors in the path and variations in parts and fixtures by permitting limited movement of the tool while maintaining an acceptable cutting force. In this way, variations in the surface being deburred or inaccuracies in the programmed path which are within the limits of the compliance will be accommodated and damage to the cutting surface of the tool and the finished product will be minimized.

Several types of compliant tool holders have been disclosed in the prior art. In U.S. Pat. No. 4,637,775 entitled "Industrial Robot Device," compliance is provided by a spring built into the device holding the tool. The spring permits the tool, which is comprised of the cutting surface and the drive means for the cutting surface, to move laterally relative to the axis of the tool and away from the edge being deburred. In U.S. Pat. No. 4,860,500 entitled "Passive Actuator to Maintain a Constant Normal Cutting Force During Robotic Deburring," an air cylinder with a low friction piston is used to provide a zero spring rate compliance. Here the cutting surface and the drive means of the tool are permitted to move laterally to accommodate path errors and surface variations. Further, it is known to provide compliance devices in robotic deburring tools. For example, there is commercially available a robotic deburring tool known as Amtru Flexicut 240 which is manufactured in Switzerland. This robotic deburring tool includes an air motor disposed within a housing. The air motor includes a rear or back portion that lies within a ring-type compliance device while the front portion of the air motor extends through a mounting structure that permits the front portion of the motor to pivot. The pneumatic motor in the Amtru Flexicut deburring tool is relatively large, and because of that the entire tool is relatively heavy, bulky and expensive.

SUMMARY OF THE INVENTION

The present invention entails a deburring tool having a housing and a pneumatic motor mounted in the housing. The pneumatic motor includes a spindle and a backwall. A pivot-bearing is mounted adjacent the backwall of the pneumatic motor. A connector extends from the backwall of the pneumatic motor and connects to the pivot bearing. This permits the pneumatic motor to move with the pivot bearing. A compliance device extends around the pneumatic motor at a location between the backwall and an outer end of the drive shaft. The compliance device limits the movement of the pneumatic motor and applies a compliance force to the pneumatic motor as the pneumatic motor moves with the pivot bearing.

In another embodiment of the present invention, the deburring tool includes a housing and a pneumatic motor mounted in the housing and which includes a back portion and a front portion. A pivot bearing is mounted adjacent the back portion of the pneumatic motor. A connector extends from the back portion of the pneumatic motor to the pivot bearing and connects the pneumatic motor with the pivot bearing such that the pneumatic motor may move with the pivot bearing.

In yet another embodiment of the present invention, the deburring tool comprises a housing and a pneumatic motor mounted in the housing. The pneumatic motor includes a back portion and a front portion and wherein the back portion includes a cross-sectional area greater than the cross-sectional area of the front portion. A mounting structure is disposed at least partially within the housing for moveably mounting the pneumatic motor therein. A compliance device extends around the front portion of the pneumatic motor for restricting the movement of the pneumatic motor and applying a compliance force to the pneumatic motor.

Other objects and advantages of the present invention will become apparent and obvious from a study of the following description and the accompanying drawings which are merely illustrative of such invention.

DESCRIPTION OF EXEMPLARY EMBODIMENT

Figure 1:
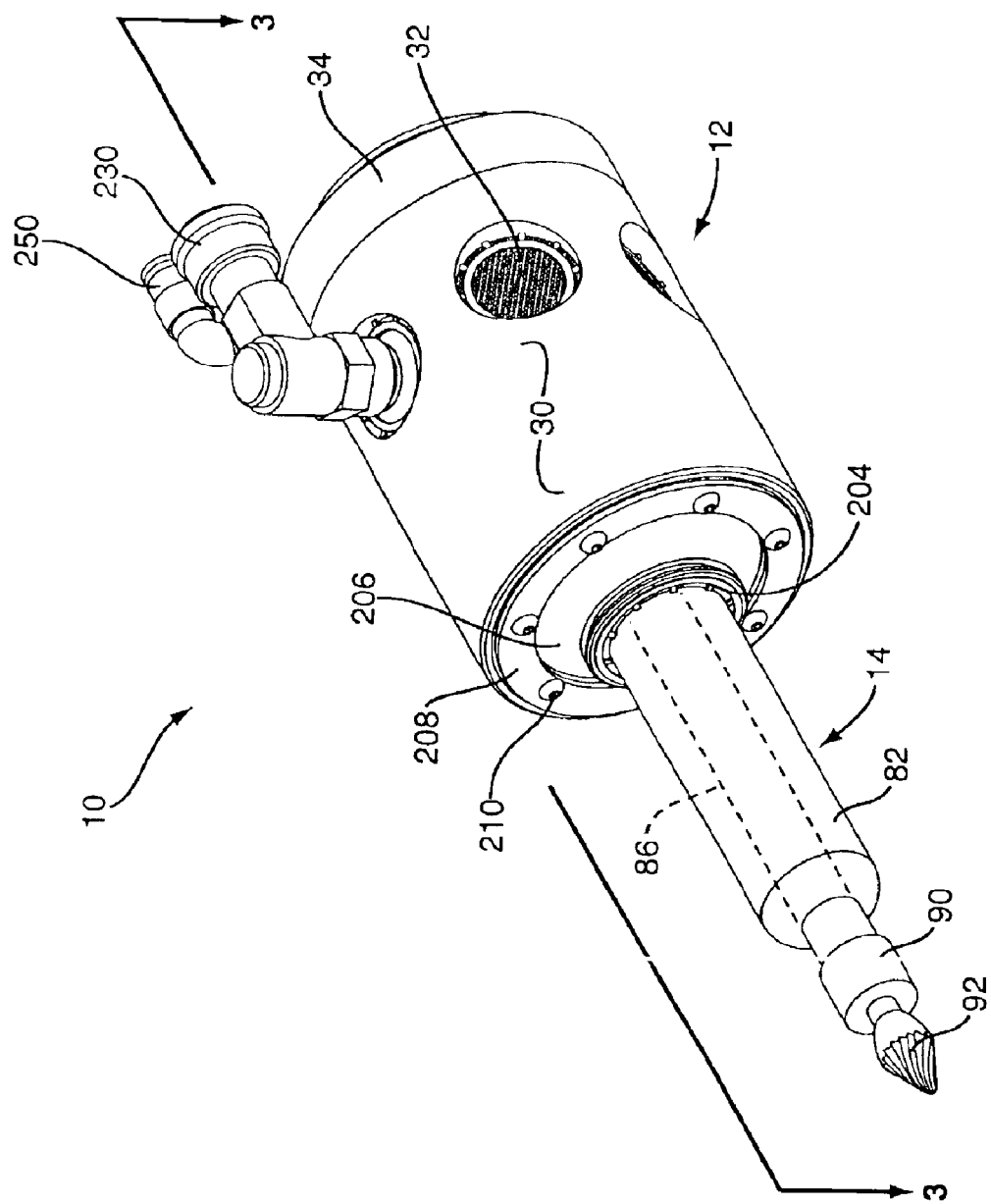
FIG. 1 is a perspective view of the deburring tool.

With further reference to the drawings, the deburring tool of the present invention is shown therein and indicated generally by the numeral 10. Deburring tool 10 includes a housing 12. Mounted within the housing is a pneumatic motor 14. Pneumatic motor 14 is supported within the housing 12 by a bearing assembly 16 and a compliance device 20. More particularly, a pivot bearing 16 is secured within the rear of housing 12 and is operatively connected to the back of pneumatic motor 14 through a connector indicated generally by the numeral 18. Pneumatic motor 14 is effectively suspended or supported at the rear by the pivot bearing 16. A front or spindle portion of the pneumatic motor 14 projects through the compliance device 20. As will be appreciated from subsequent portions of the disclosure, the pivot bearing 16 enables the pneumatic motor 14 to freely articulate radially in any direction while preventing free rotation about the bearing's longitudinal axis. Compliance device 20, which surrounds the spindle or front portion of the pneumatic motor 14, functions to center the spindle of the pneumatic motor 14, but also yields in response to a disturbing force experienced by the deburring tool 10.

Figure 2:
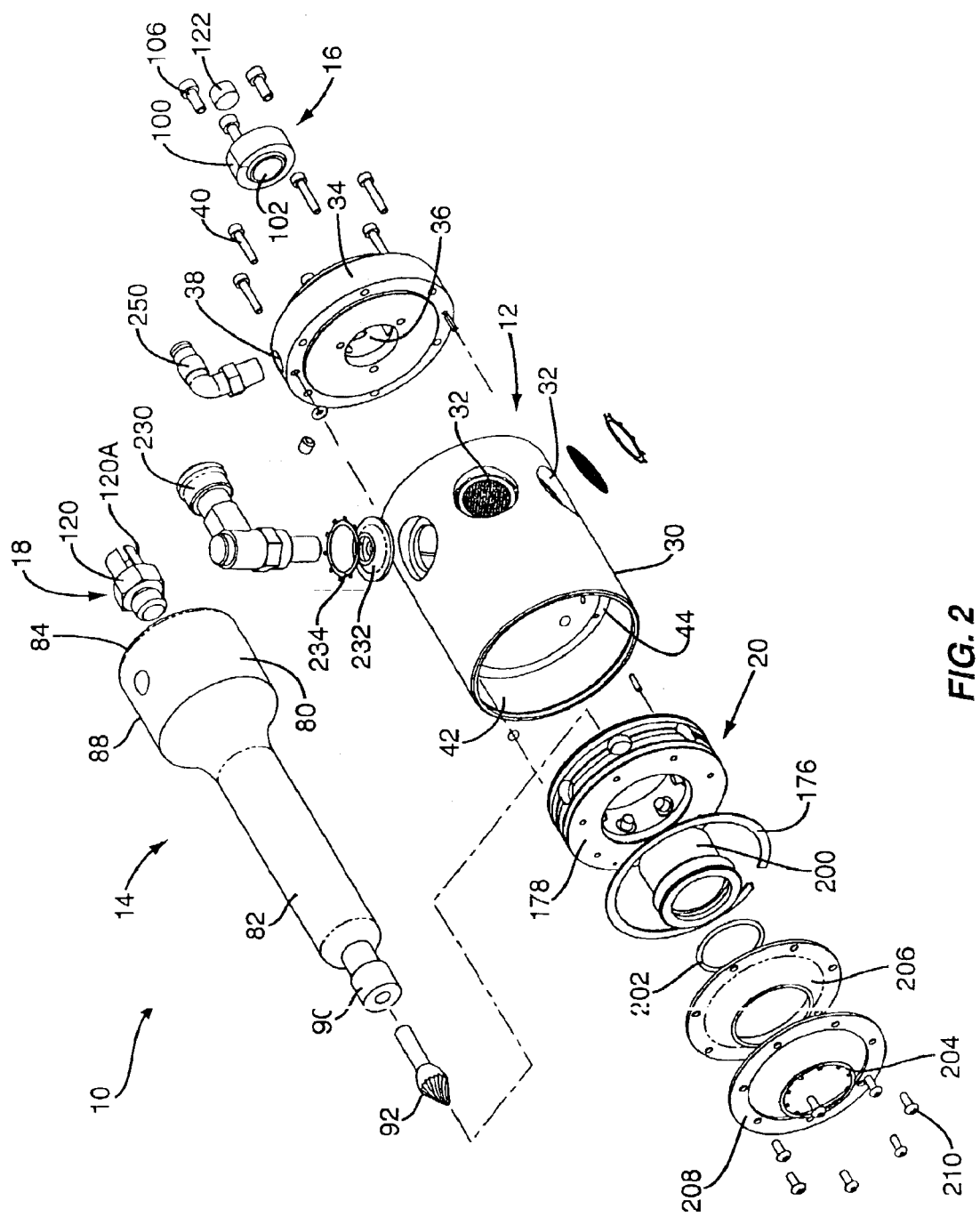
FIG. 2 is an exploded perspective view of the deburring tool.
Figure 3:
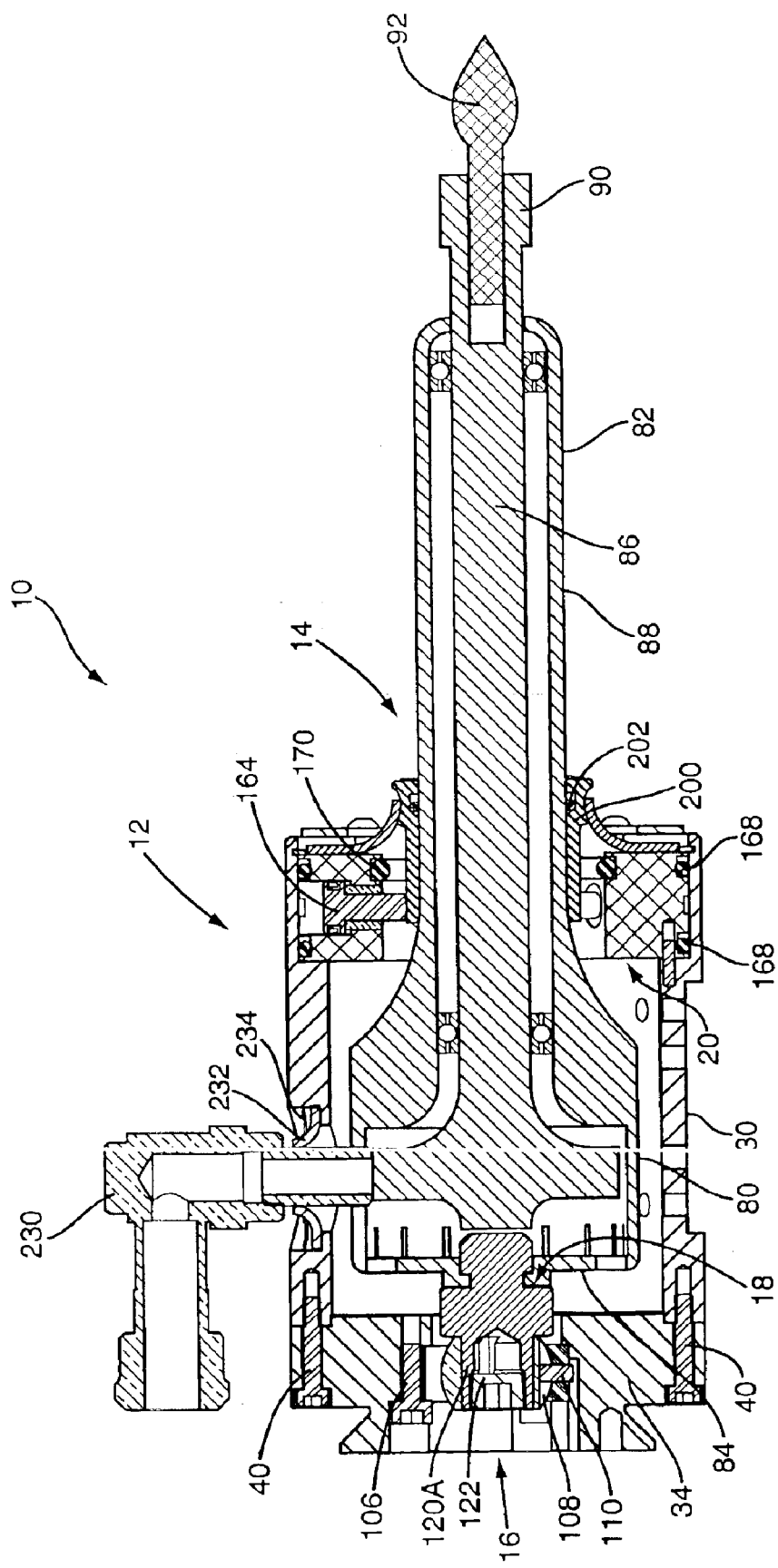
FIG. 3 is a longitudinal sectional view of the deburring tool taken through the line 3—3 of FIG. 1.

Turning first to a discussion of the housing 12, it is seen from FIGS. 1–3 that the housing includes a cylindrical section 30. The cylindrical section includes a series of openings 32. Some of the openings 32 function to exhaust air utilized by the pneumatic motor 14 while another opening provides access for an air inlet through which compressed air passes for the purpose of driving the pneumatic motor 14.

As seen in the drawings, opposite ends of the cylindrical section 30 are open. Secured to the rear portion of the cylindrical section 30 is a back plate 34. Back plate 34 includes a central opening 36 formed therein. Formed about the outer circumference of the back plate 34 is an air inlet 38. As will be discussed in further detail subsequently herein, compressed air is directed through the air inlet 38 and to the compliance device 20 which is mounted in the front portion of the housing 12.

Formed about the circumference of the back plate 34 is a series of through bores. A series of screws 40 project into these through bores and into threaded openings formed around the back edge of the cylindrical section 30. Consequently the screws 40 effectively secure the back plate 34 to the central section 30. Opposite the back plate 34 is a front opening 42 which can be seen in FIG. 2. Spaced inwardly from the front opening is a circumferential shoulder 44. Again, as will be understood from subsequent portions of this disclosure, shoulder 44 serves as a stop against which the compliance device 20 rests when the compliance device is appropriately secured within housing 12.

As noted above, the pneumatic motor 14 is housed within housing 12. Various types of pneumatic motors can be utilized. In one exemplary embodiment, a pneumatic motor of an air turbine type rated at 340 watts and 40,000 rpm would be appropriate. In the case of the pneumatic motor 14, particularly shown in FIGS. 2 and 3, for purposes of reference, the pneumatic motor 14 includes a rear portion 80 and a front or spindle portion 82. As illustrated in FIGS. 2 and 3, note how the rear portion 80 tapers down and transitions into the front or spindle portion 82. The rear or back portion 80 is of a cross-sectional area greater than the front or spindle portion 82. By the same token, the rear portion 80 is more massive than the front portion 82. Consequently, the center of gravity of the motor 14 tends to reside in or near the rear portion 80.

Front or spindle portion 82 would include a drive shaft 86 that extends through the front or spindle portion and is operative to drive a collet 90. Secured to collet 90 in a conventional fashion is a cutter or deburring tool 92.

Pneumatic motor 14 includes a housing 88 and forming a portion of the housing is a back or back wall 84. Back 84 includes a threaded opening formed therein. As will be discussed later, the threaded opening receives and supports a connector that projects therefrom and which connects to the bearing assembly 16 which effectively supports the rear portion of the pneumatic motor 14.

Figure 4:
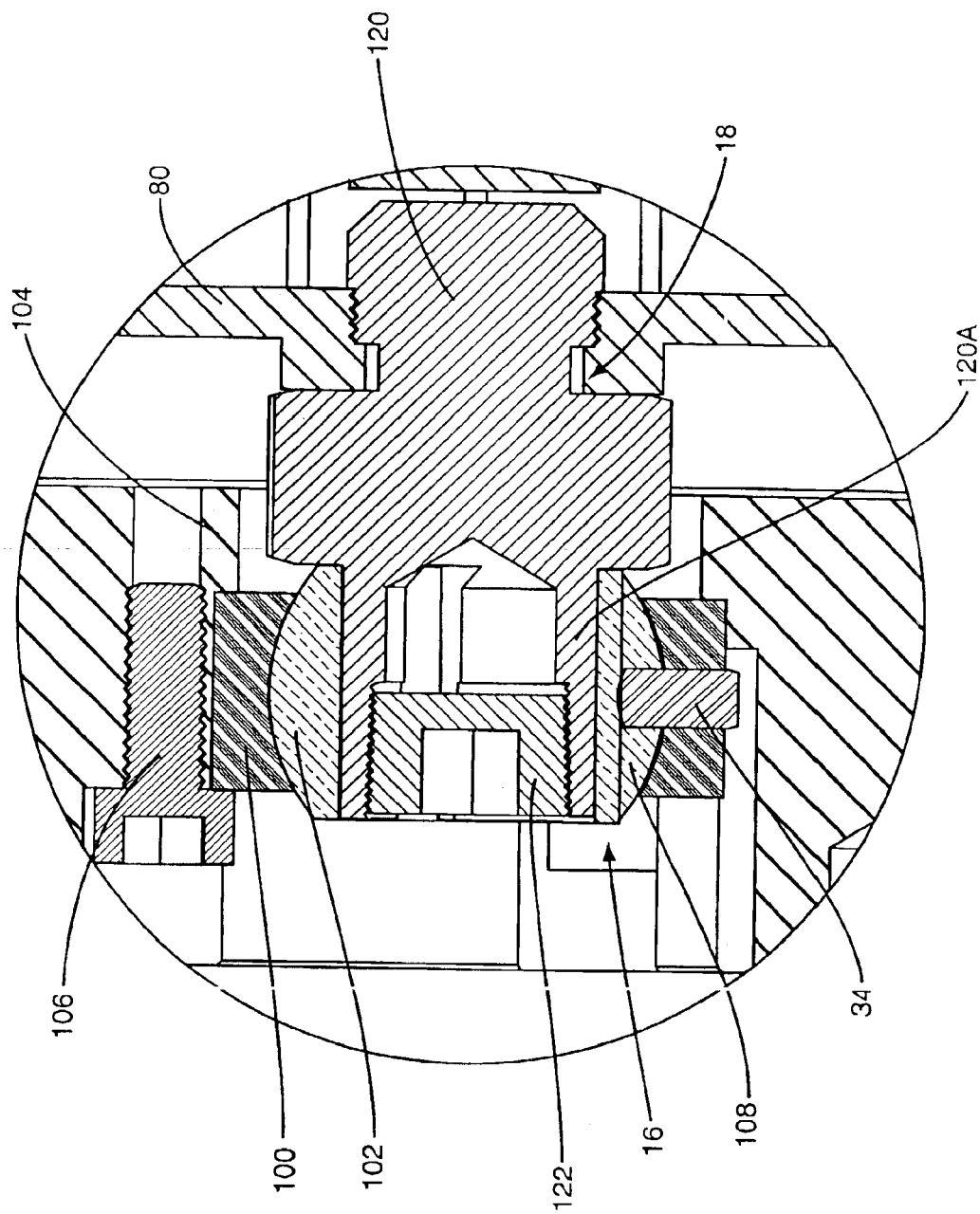
FIG. 4 is an enlarged sectional view of a portion of the deburring tool illustrating how the rear portion of the pneumatic motor is moveably mounted within the housing.

Mounted within end plate 34 is the bearing assembly indicated generally by the numeral 16 and sometimes referred to as a pivot bearing. The bearing assembly includes an outer race or socket 100. Secured within the outer race 100 is a bearing 102. In the case of the embodiment illustrated herein and particularly shown in FIGS. 2–4, the bearing 102 includes an arcuate shaped outer surface that freely moves within the race 100. Bearing 102, in the embodiment illustrated, assumes a partial ball or spherical configuration and includes a through bore or opening that extends through the same. Note in FIG. 4 where the end plate 34 includes a circumferential shoulder 104 that extends around a portion of the opening 36 formed therein. Formed in the end plate adjacent the shoulder 104 is a series of threaded openings that are adapted to receive a series of screws 106. Note that each screw 106 includes a head portion. To secure the bearing assembly 16 within the end plate 34, the respective screws 106 effectively pinch the outer race or socket 100 of the bearing assembly 16 between the head of the screws 106 and the circumferential shoulder 104. This is best illustrated in FIG. 4.

Bearing 102 is designed to freely move radially in all directions but prevented from free rotation. To achieve this, a slot 108 is formed in an outer portion of the bearing 102. Again, this is illustrated in FIG. 4. A dowel pin 110 is inserted through the outer race 100 into the slot 108. The dowel pin is fixed with respect to the outer race 100. Thus the bearing 102 can pivot within the outer race 100 about the axis of the dowel pin 100. Further, the bearing 102 can rock back and forth or from left to right as viewed in FIG. 4. That is, the bearing 102 may move such that the slot 108 formed therein moves back and forth about the dowel pin 110. Consequently, this gives rise to the bearing having the capability to move or pivot. However, the dowel pin 110 and the slot 108 prevent the bearing 102 from rotating about the longitudinal axis of the race 100 of the bearing.

Extending from the pneumatic motor 14 into the bearing assembly 16 is a connector indicated generally by the numeral 18. The connection 18 may be a part of the pneumatic motor 14 or may be a separate component. As noted above, formed in the back 84 of the pneumatic motor 14 is a threaded bore. Secured within the threaded bore is a stud 120. See FIGS. 2–4. Stud 120 projects rearwardly from the back 84 of the motor 14. Forming a part of the stud 120 is a series of expandable threaded sections 120A. See FIGS. 2 and 4. The expandable sections 120A project through the opening within bearing 102. To secure the connector 18 and particularly stud 20 within the opening within bearing 102, there is provided a tapered threaded plug 122. Threaded plug 122 is screwed into the opening formed within the expandable sections 120A. As the threaded plug 122 is advanced, the sections 120A of the stud expand and engage the bearing 102. As the plug 122 is advanced towards the pneumatic motor 14, the expandable sections 120A continue to be expanded and a resulting outward directed force causes the expandable sections 120A to be securely stationed within the internal opening within the bearing 102.

Figure 5:
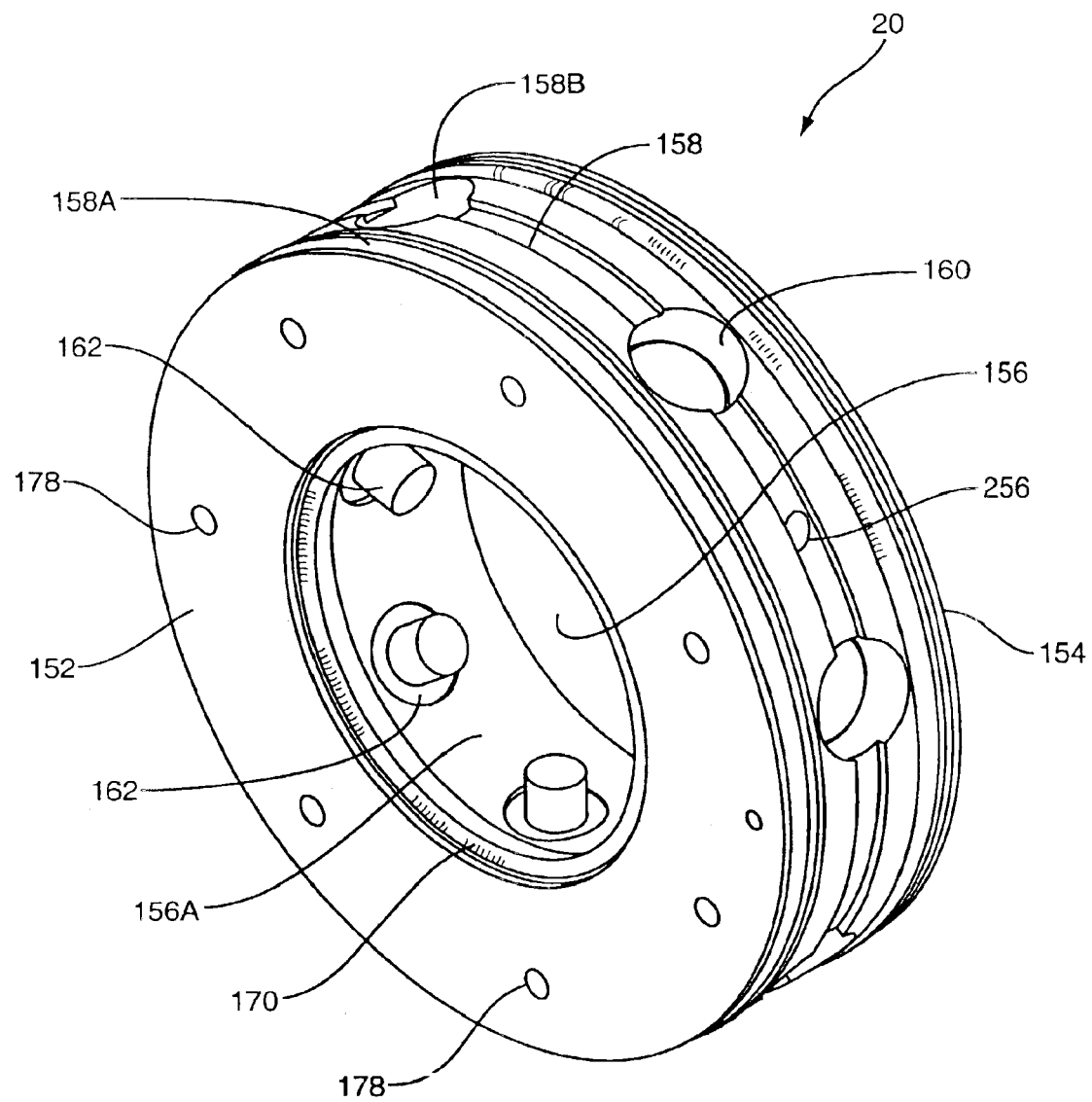
FIG. 5 is a perspective view of the compliance device of the deburring tool.
Figure 6:
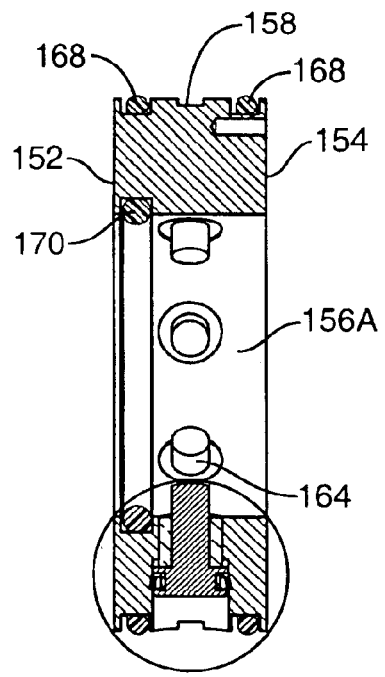
FIG. 6 is a sectional view of the compliance device illustrating the compliance device set-up for operation in one mode.

Mounted in the front portion of the housing 12 is the compliance device 20. Compliance device 20 is particularly illustrated in FIGS. 5–7. Compliance device 20 assumes a ring configuration and is adapted to extend around the front or spindle portion 82 of the pneumatic motor 14 when mounted within the housing 12. With particular reference to FIG. 5, the compliance device 20 is shown therein and includes two sides 152 and 154. When mounted within the housing 12, side 152 forms a front side while side 154 forms a rear side and faces back towards the rear portion 80 of the pneumatic motor 14. Formed within the compliance device 20 is an opening 156. Opening 156 is defined by a circumferential surface 156A. Extending around the outer edge of the compliance device 20 is a circumferential edge 158. Formed about circumferential edge 158 is a pair of spaced apart O-ring seats 158A and 158B. When mounted within the housing 12, a pair of O-ring seals 168 are seated within seats 158A and 158B.

Figure 7:
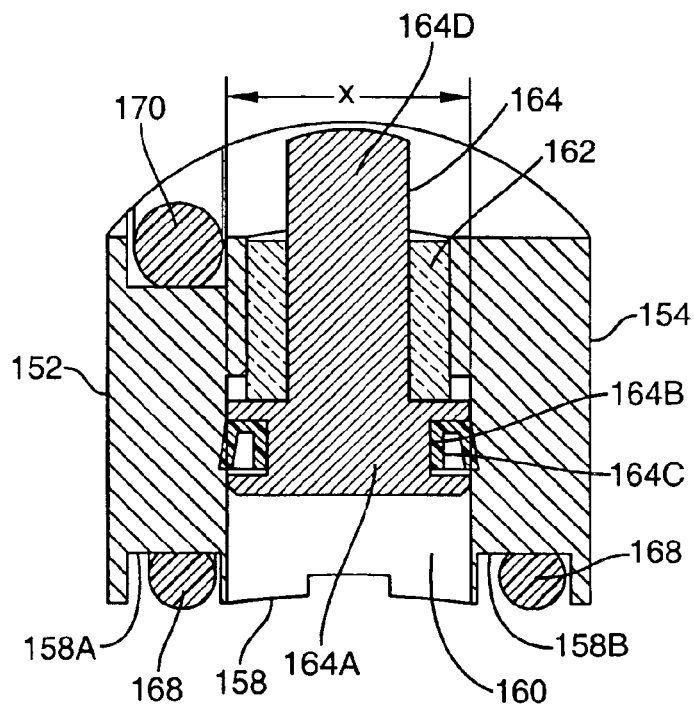
FIG. 7 is an enlarged sectional view of a portion of the compliance device shown in FIG. 6.
Figure 8:
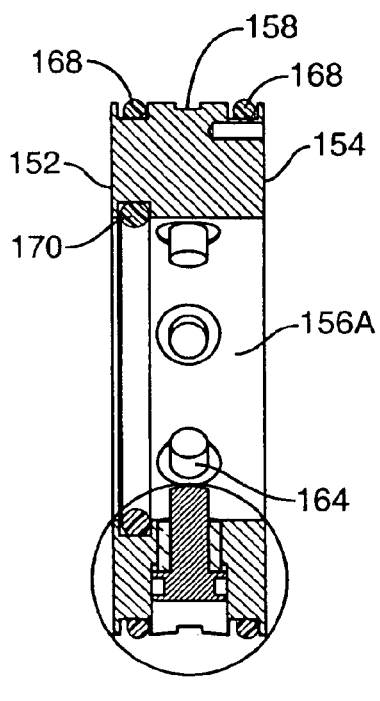
FIG. 8 is a sectional view of the compliance device set-up for operation in a second mode.
Figure 9:
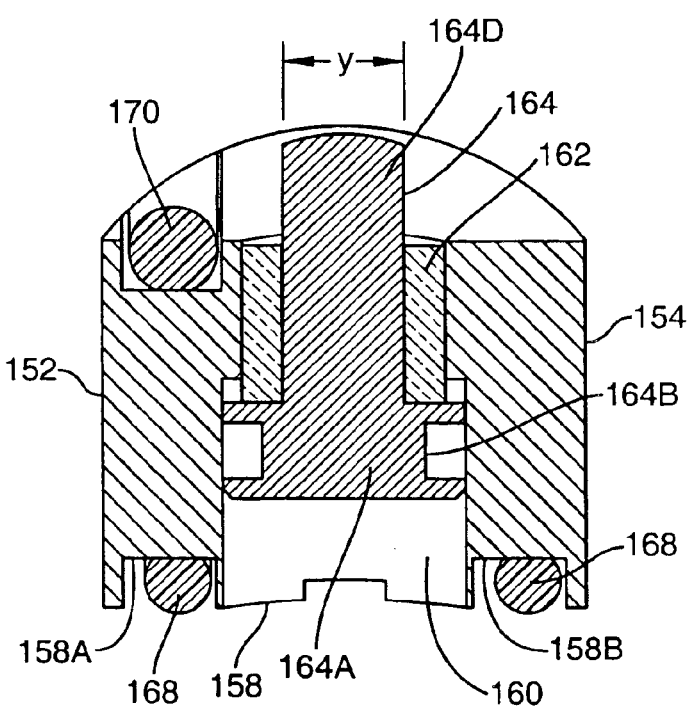
FIG. 9 is an enlarged sectional view of a portion of the compliance device shown in FIG. 8.

Formed in the compliance device 20 is a series of spaced apart piston assemblies. Each piston assembly is formed by a bore 160. Note that each bore 160 extends from the circumferential edge 158 inwardly to the central opening 156. A bushing 162 is pressed into each bore 160. This is illustrated in FIGS. 7 and 9. Reciprocally mounted in the bushing 162 is a piston indicated by the numeral 164. Piston 164 includes a base 164A and a seal seat 164B that extends around base 164A. As will be explained later, the compliance device 20 is adapted to operate in two different modes, one mode with seals and one mode without seals. FIG. 7 illustrates the mode where the respective pistons 164 are provided with seals. More particularly, there is provided a seal 164C that is seated within seal seat 164B. Extending inwardly through the bore 160 is a rod or pin 164D. Rod or pin 164D includes a generally arcuate or rounded outer tip.

As is appreciated, compliance device 20 is operated by fluid. In the case of one embodiment, compressed air is utilized to actuate and bias the pistons towards an extended position (shown in FIGS. 7 and 9) within opening 156. Consequently, it is important to provide compressed air between the circumferential edge 158 and the central section 30 of the housing 12. Therefore, an air channel 256 is provided within the outer ring of the compliance device 20. More particularly, the air channel 256 includes an inlet end formed on the rear side 154. The air channel extends therefrom a predetermined distance and then turns approximately 90° where the same air channel terminates about the circumferential edge 158. See FIG. 5. Thus, air can be directed into an opening or port formed on the rear side 154 of the compliance device and through the air channel 256 to where the air is exhausted out the circumferential edge 158. From there the air can move around the circumferential edge 158 and into the various bores 160 formed in the ring portion of the compliance device 20.

To retain the air about the circumferential edge 158 of the compliance device 20, there is provided a pair of O-rings 168. This is particularly illustrated in FIGS. 7 and 9 as well as FIG. 3.

Formed about the front portion of the central opening 156 is a relatively soft O-ring buffer 170. As will be appreciated from subsequent portions of the disclosure, a sleeve extends around the front or spindle portion 82 of the pneumatic motor 14 and as the front or spindle portion 82 moves back and forth, the buffer 170 functions to engage and soften the impact of the spindle 82.

To facilitate mounting and aligning the compliance device 20 in the front portion of the housing 12, there is provided at least one bore 172 that is formed on the rear face 154 of the compliance device. One or more pins 174 project from the shoulder 44 into the one or more pin bores 172. A snap ring 176 is snapped into a groove in the front of the central section 30 of the housing 12. Snap ring 176 abuts against the front face 152 of the compliance device 20 and holds the same within the front portion of the housing. Note that the shoulder 44 formed in the front portion of the housing 12 acts as a stop against which the back side 154 abuts when the compliance device 20 is mounted within the housing. Therefore, the compliance device is securely held in place within the housing 12 by the shoulder 44 and the snap ring 176.

Secured on the front portion or spindle 82 of pneumatic motor 14 is a contact sleeve 200. Contact sleeve 200 is particularly spaced on the spindle 82 such that it aligns with the pistons 164 disposed within the compliance device 20. This is particularly illustrated in FIG. 3. Formed on the inside surface of the contact sleeve about a front portion is an O-ring seat. An O-ring 202 is secured within the seat and acts as an interface between the contact sleeve 200 and the adjacent spindle 82. In addition, the contact sleeve 200 is firmly fixed about the spindle 82 by a retaining ring 204. As illustrated in FIG. 2, retaining ring 204 is designed to fit over the spindle 82 and to securely lock the contact sleeve 200 in a position on the spindle 82 where the compliance device surrounds the contact sleeve. Therefore, it is appreciated that when a compliance force is exerted on the pneumatic motor 14 by the compliance device 20, that the pistons 164 of the compliance device will actually engage the outer surface of the contact sleeve 200.

The front portion of the deburring tool 10 is closed by a boot 206 and a boot retaining ring 208. More particularly, boot 206 is slipped or past over the spindle 82 of the pneumatic motor 14 and secured around the front face or side 152 of the compliance device 20 by the boot retaining ring 208. A set of screws 210, as illustrated in FIGS. 2 and 3, are extended through openings within the boot retaining ring 208 and further through the openings within the boot 206 and screwed into the threaded bores 178 formed on the face 152 of the compliance device 20.

In a preferred embodiment, the power source for driving the deburring tool 10 is a pneumatic type motor. To supply air to the pneumatic motor 14 there is provided an air inlet fitting 230. See FIGS. 1–3. Air inlet 230 is of an L-shaped design and is directed to the pneumatic motor 14 through an opening in the central section 30 of the housing 12. Note that a portion of the air inlet 230 is directed through a boot 232 and a retaining ring to where the air inlet connects to an opening in the pneumatic motor 14. Boot 232 is held within the opening within central section 30 by the retaining ring 234. In operation, a source of compressed air is connected to the air inlet 230 and supplies air to the pneumatic motor 14.

Figure 10:
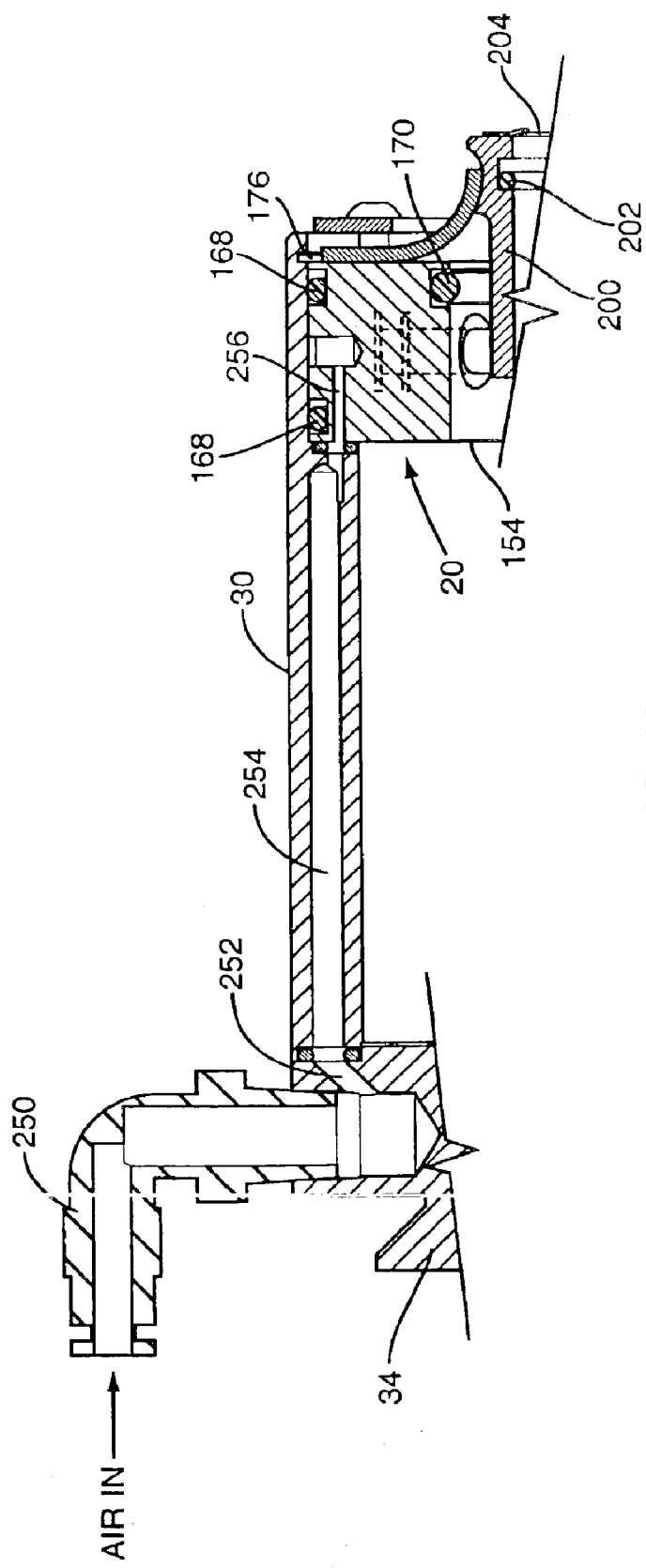
FIG. 10 is a fragmentary sectional view of the deburring tool illustrating the manner of directing compressed air to the compliance device.

Another air inlet, air inlet 250 is also provided. Air inlet 250 is secured to port 38 formed in the end plate 34. Air inlet 250 is utilized to direct air into the deburring tool 10 that is ultimately used to drive or power the compliance device 20. In order to route compressed air from the air inlet 250 to the compliance device 20, there is provided a series of air channels or conduits formed in the housing 12. See FIG. 10. In this regard, there is an air channel 252 that extends from port 38 in the end plate 34. In addition, another air channel 254 extends through the wall of central section 30 and connects air channel 252 with air channel 256 formed in the compliance device 20. As seen in FIG. 10, the air channel 256 formed in the compliance device 20 extends inwardly from the rear side 154 a predetermined distance and then turns outwardly and extends towards the outer circumferential edge 158 of the compliance device where the air channel terminates.

It is appreciated that when the end plate 34 is secured to the central section 30 of the housing and the compliance device 20 is properly secured within the housing 12, that the air channels 252, 254 and 256 will align. In addition, there will be provided O-rings between the respective air channels so as to prevent air from significantly leaking as the air moves from the end plate 34 to the compliance device 20.

Compliance device 20 functions to center the spindle or front portion 82 of the pneumatic motor during operation. However, the compliance device is yieldable. That is, when a disturbing force is encountered by the deburring tool 92, the spindle 82 will be caused to move and one or more pistons mounted within the compliance device 20 will be engaged by the spindle 82 and because of the disturbing force, the respective pistons 104 will yield and retract within the bores 160 of the compliance device 20. As the robotic tool moves around the surface being deburred, the disturbing force will subside, and the pneumatic pressure acting on the pistons 164 will urge the spindle 82 to a centered position. Because of the constant pneumatic pressure being applied to the base 164A of the pistons, the tendency of the compliance device is, of course, to maintain the spindle 62 in a centered position as illustrated in FIG. 3.

As illustrated in FIGS. 6–9, the respective pistons 164 have a limited inward extension. In FIGS. 7 and 9 the pistons 164 are fully extended inwardly. Note that the base 164 abuts against the bushing 162. This assures that the pistons 164 can only be extended inwardly a predetermined distance.

One feature of the deburring tool 10 of the present invention is that the deburring tool can provide a variable compliance force. This is particularly illustrated in FIGS. 7 and 9. That is, in one mode of operation deburring tool 10 may provide a greater compliance force than in a second mode of operation. This is achieved by electing on the one hand to utilize the seals 164C or electing not to use the seals. In FIG. 7, for example, the deburring tool 10 has been set up in a mode of operation that utilizes seals 164C around the base 164A of each piston 164. As illustrated in FIG. 7, the effective area subjected to the compressed air is illustrated by the letter X. To reduce the compliance force being exerted by the compressed air on the pistons, the seals 164C can be removed. This is illustrated in FIG. 9. Here note that there are no seals extending around the seal seat 164B. In this case, as illustrated in FIG. 9, the effective area acted on by the compressed air is illustrated by the letter Y.

In the case of the design illustrated herein, the pneumatic motor 14 includes a varying cross sectional area from back to front. As seen in the drawings, the back or rear portion 80 of the pneumatic motor 14 is larger than the front or spindle portion 82. This means that the back portion 80 would weigh more than the front portion 82 and consequently the center Of gravity of the motor 14 would tend to be located more towards the rear or back portion of the motor than towards the front portion of the motor. Accordingly, the present invention has placed the primary mounting structure for the pneumatic motor 14 adjacent the rear portion 80. In this regard, as discussed above, the bearing assembly 16 is disposed adjacent the back wall 84 of the motor. The arrangement of the bearing assembly 16 and the connector 18 permits the motor 14 to swivel or pivot about the outer race 100 of the bearing 16. In the case of the particular embodiment illustrated herein, the motor 16 can move or pivot radially similar to a joystick. Other types of mounting arrangement could be utilized.

The deburring tool 10 of the present invention has many advantages. Because of the design and arrangement of the motor 14, compliance device 20 and the manner of movably mounting the motor 14 within the housing 12, the overall deburring tool is relatively small, of a light weight, and inexpensive.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed:

1. A deburring device comprising:
   a housing;
   a pneumatic motor mounted in the housing and including a back wall and a spindle having a front end configured to attach to a deburring tool;
   a spherical pivot bearing mounted adjacent the back wall of the pneumatic motor for allowing the motor to move relative to the housing;
   a connector extending from the back wall of the pneumatic motor and connected to the pivot bearing for permitting the pneumatic motor to move with the pivot bearing; and
   a compliance device extending around the pneumatic motor at a location between the back wall and the front end of the spindle for centering the pneumatic motor but wherein the compliance device is yieldable in response to the deburring tool encountering a disturbing force.

2. The deburring device of claim 1 wherein the pivot bearing permits the pneumatic motor to pivot about the pivot bearing.

3. The deburring device of claim 1 wherein the compliance device includes a dual pressure range.

4. The deburring device of claim 3 wherein the compliance device includes a series of movable pistons disposed around the pneumatic motor and which are biased by a source of compressed air, and wherein each piston is adapted to operate in at least two modes and wherein the effective area of each piston exposed to the source of compressed air varies from one mode to the other mode.

5. The deburring device of claim 4 wherein each piston is provided with a removable seal, and wherein in one mode of operation the seal is secured to the piston and in the other mode of operation the seal is removed from the piston.

6. The deburring device of claim 1 wherein the pneumatic motor includes a rear portion and wherein the mass of the rear portion is greater than the mass of the spindle.

7. The deburring device of claim 6 wherein the spindle includes an elongated projection and wherein the compliance device extends around the elongated projection of the pneumatic motor.

8. The deburring device of claim 7 wherein the pivot bearing includes a socket and at least a partial ball movably mounted in the socket and including an opening; and wherein the connector extends into the opening of the partial ball and connects to the partial ball.

9. The deburring device of claim 8 wherein the connector includes a stud that extends from the back of the pneumatic motor into the opening of the ball, the stud having an end portion that includes an opening formed therein, and wherein a spreading plug is secured within the opening of the stud causing the opening of the stud to spread and engage the ball.

10. The deburring device of claim 1 wherein the pivot bearing includes a locating pin that limits movement of the pivot bearing.

11. The deburring device of claim 1 wherein the housing includes an end plate disposed adjacent the back of the pneumatic motor, and wherein the pivot bearing is mounted to the end plate.

12. The deburring device of claim 1 wherein the housing includes a surrounding sidewall structure wherein the tool includes an air inlet that extends through the sidewall structure and is connected to the pneumatic motor for delivering air to the motor.

13. The deburring device of claim 1 including a tool secured to the spindle.

14. A deburring tool comprising:
a housing;
a pneumatic motor mounted in the housing and including a back portion and a front portion;
a pivot bearing mounted adjacent the back portion of the pneumatic motor; and
a connector extending between the back portion of the pneumatic motor and the pivot bearing for connecting the pneumatic motor to the pivot bearing such that the pneumatic motor moves with the movement of the pivot bearing;
wherein the connector includes a terminal end that extends into the opening of the pivot bearing and wherein an opening is formed within the terminal end of the connector for receiving a spreading plug that spreads the terminal end of the connector into engagement with the pivot bearing.

15. The deburring tool of claim 14 wherein the back portion of the motor includes a back wall and wherein the connector extends from the back wall of the pneumatic motor into and through an opening formed in the pivot bearing.

16. The deburring tool of claim 14 wherein the pivot bearing includes a socket and a ball movably contained within the socket.

17. The deburring tool of claim 16 including a pin extending through the socket into an opening formed on the ball.

18. The deburring tool of claim 14 wherein the connector and pneumatic motor move about the pivot bearing.

19. A deburring tool comprising:
a housing;
a pneumatic motor mounted in the housing and including a back wall and a spindle having a front end;
a pivot bearing mounted adjacent the back wall of the pneumatic motor;
a connector extending from the back wall of the pneumatic motor and connected to the pivot bearing for permitting the pneumatic motor to move with the pivot bearing;
a compliance device extending around the pneumatic motor at a location between the back wall and the front end of the spindle for centering the pneumatic motor but wherein the compliance device is yieldable in response to the deburring tool encountering a disturbing force; and
the pivot bearing including a locating pin that limits movement of the pivot bearing.

20. The deburring tool of claim 19 wherein the housing includes an end plate disposed adjacent the back of the pneumatic motor, and wherein the pivot bearing is mounted to the end plate.

21. The deburring tool of claim 19 wherein the compliance device includes a series of movable pistons disposed around the pneumatic motor.

22. The deburring tool of claim 19 wherein the pneumatic motor includes a back portion and a front portion wherein the back portion includes a mass greater than the mass of the front portion.

23. A deburring tool comprising:
a housing;
a pneumatic motor mounted in the housing and including a back wall and a spindle having a front end;
a pivot bearing mounted adjacent the back wall of the pneumatic motor;
a connector extending from the back wall of the pneumatic motor and connected to the pivot bearing for permitting the pneumatic motor to move with the pivot bearing;
a compliance device extending around the pneumatic motor at a location between the back wall and the front end of the spindle for centering the pneumatic motor, the pneumatic motor including a rear portion having a mass greater than the mass of the spindle, but wherein the compliance device is yieldable in response to the deburring tool encountering a disturbing force;
wherein the spindle includes an elongated projection and wherein the compliance device extends around the elongated projection of the pneumatic motor; and
wherein the pivot bearing includes a socket and at least a partial ball movably mounted in the socket and including an opening, and wherein the connector extends into the opening of the partial ball and connects to the partial ball.

24. The deburring tool of claim 23 including a locating pin that limits the movement of the pivot bearing.

25. The deburring tool of claim 23 wherein the compliance device includes a series of movable pistons disposed around the pneumatic motor.

26. The deburring tool of claim 23 wherein the pivot bearing includes a spherical bearing.

27. The deburring tool of claim 23 wherein the center of gravity of the pneumatic motor lies within a back portion of the pneumatic motor, and wherein the compliance device is spaced from the center of gravity of the pneumatic motor.

28. A deburring tool comprising:
a housing;
a pneumatic motor mounted in the housing and including a back wall and a spindle having a front end;
a pivot bearing mounted adjacent the back wall of the pneumatic motor;

a connector extending from the back wall of the pneumatic motor and connected to the pivot bearing for permitting the pneumatic motor to move with the pivot bearing;

a compliance device extending around the pneumatic motor at a location between the back wall and the front end of the spindle for centering the pneumatic motor but wherein the compliance device is yieldable in response to the deburring tool encountering a disturbing force; and wherein the compliance device includes a dual pressure range, the compliance device including a series of movable pistons disposed around the pneumatic motor and which are biased by a source of compressed air, and wherein each piston is adapted to operate in at least two modes and wherein the effective area of each piston exposed to the source of compressed air varies from one mode to the other mode.

* * * * *